INVENTORS:
NORMAN L. EDELBERG
JOSEPH P. FIORE
BY Francis W. Crotty
THEIR ATTORNEY.

United States Patent Office 2,729,162

Patented Jan. 3, 1956

2,729,162

SCREENING APPARATUS

Norman L. Edelberg and Joseph P. Fiore, Chicago, Ill., assignors to The Rauland Corporation, a corporation of Illinois Application June 10, 1953, Serial No. 360,792

5 Claims. (Cl. 101—126)

This invention relates to the manufacture of color-image reproducers and is more particularly directed to a new and improved apparatus for manufacturing a multi-color luminescent target for use in a color-television image-reproducer of the cathode-ray type.

Recent experimentation in the field of color television has resulted in the development of a wide variety of types of color-image reproducers adapted to develop images in simulated natural color in response to applied signals. Many of these image reproducers utilize luminescent screens comprising a multiplicity of groups of elemental target areas in which each of the groups has a different color-radiation response characteristic when subjected to electron bombardment. For example, one type of color screen comprises three distinct groups of minute circular target areas. One of the target area groups emits red light when subjected to electron bombardment, another of the groups develops blue light, and the third group emits light corresponding to the green portion of the spectrum. Each of the target area groups is formed on the surface of a target member in accordance with a predetermined pattern; the patterns for the three groups are identical and are displaced upon the surface of the target member to distribute the target areas throughout that surface in a consistent overall pattern.

A somewhat similar luminescent target structure, which has been employed in various types of color-image reproducers, comprises a multiplicity of lines or strips of luminescent material including strips which emit light in each of the additive primary colors when subjected to electron bombardment. These strip-like target areas are arranged in a predetermined pattern upon the surface of a target member so that they may be selectively energized to develop a color image. The discrete target areas of the line- or strip-type luminescent screen, as well as the circular target areas of the first-described target structure, are made extremely small in size in order to avoid undesirable bar or dot patterns in the reproduced image. In virtually all of the different types of image reproducers developed to date, it is desirable that the target areas be of uniform size and that the distribution pattern be rigidly maintained throughout the target surface in order to prevent color contamination in the reproduced image.

One of the most effective methods of forming targets of this type comprises the deposition of a plurality of phosphors having differing color characteristics upon the surface of a target member in accordance with the familiar silk screen process. In this process, a phosphor "ink" is exuded through a stencil supported by a fine silk or wire mesh, the stencil having a multiplicity of apertures corresponding in configuration to the target areas of a single color group and in space distribution to the pattern of that group. Subsequently, the position of the stencil is shifted and the remaining groups are applied to the same target member in similar fashion to complete a multi-color target. However, use of the silk screen process involves several difficult problems with respect to maintenance of uniformity in the size and configuration of the target areas. For example, when the first of the target area groups is applied, the stencil may come in contact with the surface of the target member. However, on subsequent screening of the other color groups, contact with the target member surface is impeded by the phosphor deposits already formed on the target surface so that different operating conditions obtain for subsequent screenings. As a result, the target areas formed during the latter screening steps are of different size from those previously deposited upon the target member whereas it is ordinarily desirable that they be as nearly completely uniform as possible.

It is an object of the invention, therefore, to provide a new and improved screening apparatus for manufacturing a target for a color-image reproducer.

It is a further object of the invention to provide a new and improved screening apparatus for depositing a phosphor composition upon a target member in a multiplicity of uniform discrete target areas.

It is another object of the invention to provide a new and improved apparatus for the manufacture of color-image reproducer targets which are substantially interchangeable with each other.

It is a corollary object of the invention to provide a new and improved screening apparatus, for use in the manufacture of a color-image reproducer, which is simple and expedient to construct and economical in operation.

Accordingly, the invention is directed to the manufacture of a color-image reproducer and more specifically to a screening apparatus for applying a phosphor composition to a multiplicity of discrete target areas arranged in a predetermined pattern on a selected surface of a target member. In accordance with the invention, the screening apparatus comprises a screening base, means for retaining the target member on the screening base in a predetermined location in which the selected surface lies in a predetermined position, and a target stencil having a multiplicity of apertures corresponding in configuration to the desired target areas and in space distribution to their predetermined pattern. The stencil is supported in a second position parallel to and uniformly spaced a preselected distance from the target member surface. Means are provided to exude the phosphor composition through the stencil apertures onto the target member surface; this means includes a squeegee adapted to traverse the stencil in a given direction while progressively maintaining individual transverse portions of the stencil in substantially linear contact with the target member surface. The stencil is yieldably supported in the aforementioned second position by means, which includes a pair of resilient deformable support members mounted on the screening base at opposite sides of the target member mounting position, which tend to restore each transverse portion of the stencil to that second position immediately following traversal by the squeegee.

The features of the invention which are believed to be novel are set forth with particularity in the appended claims. The organization and manner of operation of the invention, together with further objects and advantages thereof, may best be understood by reference to the following description taken in conjunction with the accompanying drawing, in the several figures of which like reference numerals indicate like elements, and in which:

Figures 1, 2, 3, 4:
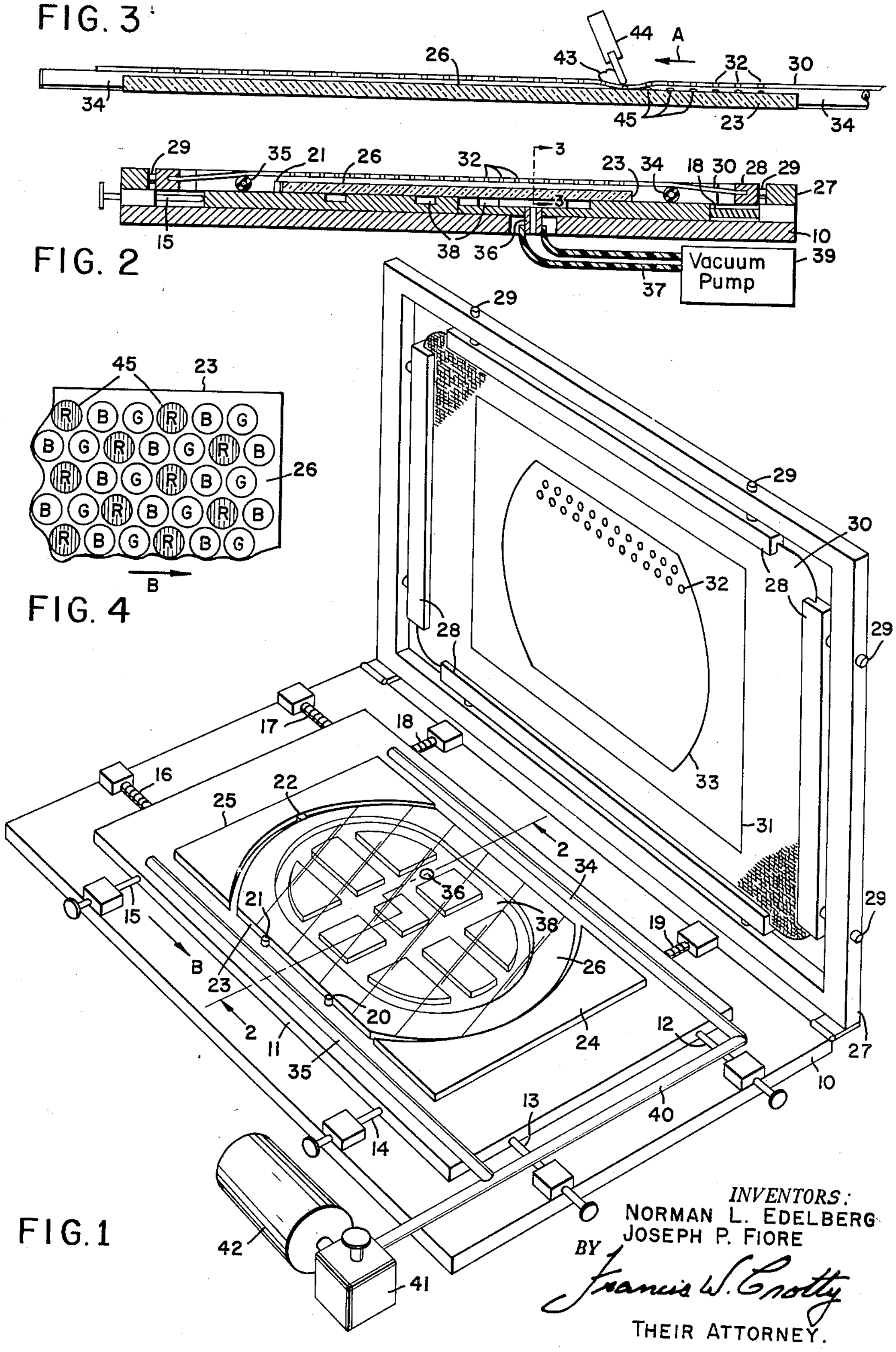
Figure 1 is a perspective view, partially schematic, of one embodiment of a screening apparatus constructed in accordance with the invention.
Figure 2 is a cross-sectional view, partially schematic, of a screening apparatus constructed in accordance with the invention, taken along line 2—2 in Figure 1.
Figure 3 is a partially schematic cross-sectional illustration of the screening apparatus, taken along line 3–3 in Figure 2.
Figure 4 is an explanatory diagram, illustrating one type of color target in greatly enlarged detail, employed to explain certain of the functional aspects of the invention.

The screening apparatus illustrated in the perspective view of Figure 1 comprises a flat bed or table 10 which supports a screening base 11. The position of screening base 11 upon bed 10 is determined by four adjustable stop members 12, 13, 14, and 15; base 11 is urged into firm mechanical engagement with stops 12 and 13 by a pair of positioning springs 16 and 17, and another pair of positioning springs 18 and 19 bias the screening base into contact with stops 14 and 15. Three indexing pins 20, 21 and 22 extend above the surface of screening base 11 at predetermined points and determine a screening position for a target member 23, here illustrated as a plate of glass or similar transparent material of predetermined configuration. Preferably, pins 20–22 should not extend above the upper surface 26 of target member 23. A pair of end pads 24 and 25 are mounted on base 11 adjacent opposite ends of target member 23 and extend to a height substantially equal to that of target member surface 26.

A screen frame 27 is hinged to bed 10 and a plurality of clamping bars 28 are mounted on frame 27 by means of suitably arranged tension screws 29. A screen 30, preferably formed from an extremely fine wire mesh and schematically illustrated to avoid confusing the drawing, is supported and held in tension by clamps 28, the proper tension being achieved by tightening screws 29 subsequent to mounting of the screen and clamp arrangement in frame 27. A stencil 31 is affixed to screen 30; stencil 31 includes a multiplicity of apertures 32 of predetermined size and configuration dispersed throughout a screening area portion 33 of stencil 31 in accordance with a predetermined pattern. Stencil 31 may comprise a gelatin-base film, in which apertures 32 are formed by photographic and etching processes, or may comprise any other suitable flexible material adapted to form a dimensionally consistent minute aperture pattern.

In Figure 1, the screening apparatus is illustrated in its open or non-screening position; the relative positions of certain portions of the apparatus when arranged for screening, as well as certain other details of the apparatus, are more clearly illustrated in Figure 2. In this view, frame 27 has been pivoted over bed 10 so that screen 30 is located in a plane parallel to and spaced by a preselected distance from the plane of target member surface 26. The distance separating screen 30 and surface 26 is determined by a pair of resilient deformable support members 34 and 35, which preferably comprise elongated tubes formed of natural or synthetic rubber or some similar elastic material. A portion of screening base 11 immediately underlying target member 23 is recessed to form a vacuum-chuck or chamber 38; a duct 36 and a hose 37 couple vacuum chamber 38 to a vacuum pump 39. Vacuum pump 39 may comprise any suitable means for at least partially evacuating a relatively small chamber; an ordinary domestic-type vacuum cleaner has been found quite satisfactory for this service.

As best shown in Figure 1, tubes 34 and 35 are each connected at one end to a manifold 40 which, in turn, is connected through a pressure control valve 41 to a compressed air source 42; the ends of tubes 34, 35 opposite manifold 40 are sealed. Compressed air source 42 may comprise any suitable pressurized air or gas container or a compressor; a bleeder valve (not shown) may be provided for the air system.

With the exception of the support means comprising members 34 and 35, manifold 40, pressure valve 41, and compressed air source 42, the screening apparatus illustrated in Figures 1 and 2 is generally similar to those well known in the silk-screening art; accordingly, a brief discussion of the operation of the apparatus is deemed sufficient. At the beginning of the screening process, target member 23 is placed upon screening base 11 in a position determined by indexing pins 20–22. Vacuum pump 39 is then placed in operation and vacuum-chuck 38 is sufficiently evacuated so that target member 23 is retained in position. The location of screening base 11 upon bed 10 is then adjusted so that the target member is correctly positioned with respect to aperture-pattern area 33 of stencil 31. Frame 27 is subsequently moved to its screening position, illustrated in Figure 2, so that stencil 31 is supported by mesh 30 and tubes 34, 35 in a plane parallel to and spaced from the plane defined by surface 26 of the target member. It should be noted that the use of a hinged construction for frame 27 is not in any way essential to the invention; the frame may be mounted in any suitable manner so long as provision is made for positioning and removal of target member 23. A phosphor composition is then applied to mesh 30, and a squeegee or scraper is employed to exude the phosphor composition through apertures 32 of stencil 31 onto surface 26 of target member 23 by traversing the stencil progressively to maintain individual transverse portions of the stencil in substantially linear contact with surface 26.

At this stage of the screening process, using the usual type of screening apparatus, it is necessary to lift stencil 31 from contact with surface 26 by simultaneously elevating all parts of the stencil in order to prevent smearing or other distortion of the phosphor pattern formed on the target member surface. The simultaneous release of the stencil from surface 26 is most difficult to accomplish and usually requires relatively complex and expensive apparatus as compared to the simple and effective means provided by the invention for progressively releasing the stencil immediately following traversal by squeegee 44. The manner of operation of the invention in this regard may best be seen by reference to Figure 3. As illustrated therein, a quantity of phosphor composition 43 is applied to screen 30 and a squeegee or spreader 44 is utilized to traverse the screen in the direction indicated by arrow A and to exude phosphor composition 43 through stencil apertures 32 onto surface 26 to form a target area pattern indicated by phosphor areas 45. Individual transverse portions of wire mesh 30 and stencil 31 are progressively maintained in linear contact with target member 23 as squeegee 44 traverses the screen; however, this contact is only momentary, and each transverse portion of the stencil and screen is separated from target member surface 26 and restored to its normal position immediately following traversal by the squeegee, due to the resilient nature of support members 34 and 35. It is particularly important that the contact pressure be substantially the same at all points as squeegee 44 traverses stencil 31, in order to avoid distortion in the configuration and dimensions of target areas 45; this uniformity of contact pressure is readily maintained by the resilient supports. Furthermore, by utilizing regulating valve 41 to adjust the air pressure within tubes 34 and 35, it is possible to regulate the contact pressure of the squeegee precisely so as to obtain optimum uniformity and clarity in the screen patterns deposited upon surface 26 during sequential screenings. However, a pressure-regulating system is not essential to the invention, and many of the advantages of the invention may be obtained by utilizing the inherent uniform resilient qualities of a rubber or other elastic tube without a pressure source or through the use of support members fabricated from sponge rubber or other suitable relatively uniformly resilient material. If tubes such as support members 34 and 35 are employed without a pressure source, it is preferred that both ends of the tubes be open to facilitate equalization of the internal air pressure.

The application of one phosphor composition to target member surface 26, as described above, results in the formation of phosphor pattern 45 upon the target member, the phosphor pattern corresponding to one of the target area groups of a multi-color target. One of the many possible patterns for such a target is illustrated in Figure 4, in which a fragmentary portion of a tri-color screen employing red-, blue-, and green-light emissive phosphors is shown, with the elements of each group being designated by appropriate letters R, B, and G respectively. The target area group having red-light emissive properties is shaded to indicate that this particular phosphor has already been applied to the target member surface. In order to apply the blue-light emissive phosphor group to the target, it is only necessary to move target member 23, in the direction indicated by arrows B in Figures 4 and 1, a distance equal to the width of one of the target areas. The screening process is then repeated, using a different phosphor composition, so that the second of the target area groups is applied to target member 23. Further movement of target member 23 relative to the stencil, again by a distance equal to the width of one target area, establishes stencil 31 and target member 23 in position for screening of the third target area group. For higher production rates it may be desirable to utilize three separate screening tables arranged to permit successive screening of the three color groups without adjusting the relative positions of the stencil and screening base for processing each target. Movement of target member 23 with respect to stencil 31 is effected most expeditiously by repositioning screening base 11 upon bed 10 through the adjustment of stop members 12 and 13 and/or stops 14 and 15, each of which may be provided with a micrometer indicator or stop-indexing mechanism (not shown) to facilitate rapid adjustment between successive screening operations.

The screening apparatus of the invention makes it possible to achieve hitherto unobtainable accuracy and uniformity in the size and configuration of the target areas applied to surface 26 of target member 23. As a result, targets manufactured with the inventive apparatus may be employed interchangeably with each other, so that destruction or damage of a target does not require reconstruction of an entire image reproducer and the reproducers may be assembled on an interchangeable-parts mass-production basis. Furthermore, the invention requires no elaborate means for simultaneously releasing the entire area of stencil 31 from the target member surface and does not introduce any distortions which might result from lack of uniformity in the restoring forces applied to screen 30 following traversal by squeegee 44. The resilient deformable support members of the invention make it possible to use an ordinary screening table for this highly exacting work without requiring expensive modifications.

While a particular embodiment of the invention has been shown and described, it is apparent that changes and modifications may be made without departing from the invention in its broader aspects. The aim of the appended claims, therefore, is to cover all such changes and modifications as fall within the true spirit and scope of the invention.

We claim:

1. In the manufacture of a color-image reproducer, a screening apparatus for applying a phosphor composition to a multiplicity of discrete target areas arranged in a predetermined pattern on a selected surface of a target member, said apparatus comprising: a screening base; means for retaining said target member on said screening base in a predetermined location in which said surface lies in a predetermined position; a target stencil, having a multiplicity of apertures corresponding in configuration to said target areas and in space distribution to said predetermined pattern; means including a frame for maintaining said stencil in a second position parallel to and uniformly spaced a preselected distance from said selected surface; means, including a spreader adapted to traverse said stencil in a given direction while progressively maintaining individual transverse portions of said stencil in substantially linear contact with said target member, for exuding said phosphor composition through said stencil apertures onto said surface of said target member; and means including a pair of resilient deformable support members, mounted on said screening base at opposite sides of said predetermined location, for yieldably supporting said stencil in said second position and tending to restore each transverse portion of said stencil to said second position immediately following traversal by said spreader.

2. In the manufacture of a color-image reproducer, a screening apparatus for applying a phosphor composition to a multiplicity of discrete target areas arranged in a predetermined pattern on a selected surface of a target member, said apparatus comprising: a screening base; means for retaining said target member on said screening base in a predetermined location in which said surface lies in a predetermined plane; a target stencil, having a multiplicity of apertures corresponding in configuration to said target areas and in space distribution to said predetermined pattern; means including a frame for maintaining said stencil in a second plane parallel to and spaced a preselected distance from said predetermined plane; means, including a squeegee adapted to traverse said stencil in a given direction while progressively maintaining individual transverse portions of said stencil in substantially linear contact with said target member, for exuding said phosphor composition through said stencil apertures onto said surface of said target member; and means including a pair of elongated resilient deformable support rails, mounted on said screening base at opposite sides of said predetermined location, for yieldably supporting said stencil in said second plane and tending to restore each transverse portion of said stencil to said second plane immediately following traversal by said squeegee.

3. In the manufacture of a color-image reproducer, a screening apparatus for applying a phosphor composition to a multiplicity of discrete target areas arranged in a predetermined pattern on a selected surface of a target member, said apparatus comprising: a screening base; means for retaining said target member on said screening base in a predetermined location in which said surface lies in a predetermined position; a target stencil, having a multiplicity of apertures corresponding in configuration to said target areas and in space distribution to said predetermined pattern; means including a frame for maintaining said stencil in a second position parallel to and uniformly spaced a preselected distance from said position selected surface; means, including a squeegee adapted to traverse said stencil in a given direction while progressively maintaining individual transverse portions of said stencil in substantially linear contact with said target member, for exuding said phosphor composition through said stencil apertures onto said surfaces of said target member; means including a pair of resilient deformable support members, mounted on said screening base at opposite sides of said predetermined location, for yieldably supporting said stencil in said second position and tending to restore each transverse portion of said stencil to said second position immediately following traversal by said squeegee; and means for effecting relative lateral movement of said screening base with respect to said stencil effectively to establish said stencil in a third position parallel to said selected surface and spaced therefrom by a distance equal to said predetermined distance.

4. In the manufacture of a color-image reproducer, a screening apparatus for applying a phosphor composition to a multiplicity of discrete target areas arranged in a predetermined pattern on a selected surface of a target member, said apparatus comprising: a screen base; means for retaining said target member on said screening base in a predetermined location in which said surface lies in a predetermined position; a target stencil, having a multiplicity of apertures corresponding in configuration to said target areas and in space distribution to said predetermined pattern; means including a frame for maintaining said stencil in a second position parallel to and spaced a preselected distance from said selected surface; means, including a squeegee adapted to traverse said stencil in a given direction while progressively maintaining individual transverse portions of said stencil in substantially linear contact with said target member, for exuding said phosphor composition through said stencil apertures onto said surface of said target member; and means including a pair of support members, each comprising an elongated tube formed from a resilient deformable material, mounted on said screening base at opposite sides of said predetermined location, for yieldably supporting said stencil in said second position and tending to restore each transverse portion of said stencil to said second position immediately following traversal by said squeegee.

5. In the manufacture of a color-image reproducer, a screening apparatus for applying a phosphor composition to a multiplicity of discrete target areas arranged in a predetermined pattern on a selected surface of a target member, said apparatus comprising: a screen base; means for retaining said target member on said screening base in a predetermined location in which said surface lies in a predetermined position; a target stencil, having a multiplicity of apertures corresponding in configuration to said target areas and in space distribution to said predetermined pattern, adapted to be supported in a second position parallel to and spaced a preselected distance from said selected surface; means, including a squeegee adapted to traverse said stencil in a given direction while progressively maintaining individual transverse portions of said stencil in substantially linear contact with said target member, for exuding said phosphor composition through said stencil apertures onto said surface of said target member; means including a pair of support members, each comprising an elongated tube formed from a resilient deformable material, mounted on said screening base at opposite sides of said predetermined location, for yieldably supporting said stencil in said second position and tending to restore each transverse portion of said stencil to said second position immediately following traversal by said squeegee; and means for varying the internal air pressure within said tubes to adjust the resistance offered by said support members to said squeegee.

References Cited in the file of this patent

UNITED STATES PATENTS

| | | |
|---|---|---|
| 1,922,710 | Owen | Aug. 15, 1933 |
| 2,064,284 | Wulf | Dec. 15, 1936 |

FOREIGN PATENTS

| | | |
|---|---|---|
| 230,345 | Great Britain | Mar. 12, 1925 |